(12) United States Patent
Wang et al.

(10) Patent No.: US 9,885,930 B2
(45) Date of Patent: Feb. 6, 2018

(54) ARRAY SUBSTRATE, DISPLAY PANEL, DISPLAY DEVICE AND ELECTRONIC DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Rui Wang, Beijing (CN); Fei Shang, Beijing (CN); Shaoru Li, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/107,083

(22) PCT Filed: Dec. 10, 2015

(86) PCT No.: PCT/CN2015/097024
§ 371 (c)(1),
(2) Date: Jun. 21, 2016

(87) PCT Pub. No.: WO2017/000505
PCT Pub. Date: Jan. 5, 2017

(65) Prior Publication Data
US 2017/0205673 A1    Jul. 20, 2017

(30) Foreign Application Priority Data

Jun. 30, 2015 (CN) .......................... 2015 1 0374462

(51) Int. Cl.
*G02F 1/1362* (2006.01)
*G02F 1/133* (2006.01)
(Continued)

(52) U.S. Cl.
CPC ...... *G02F 1/136213* (2013.01); *G02F 1/1368* (2013.01); *G02F 1/13306* (2013.01);
(Continued)

(58) Field of Classification Search
CPC ........... G02F 1/136213; G02F 1/13306; G02F 1/134309; G02F 1/136259;
(Continued)

(56) References Cited

U.S. PATENT DOCUMENTS

2009/0135125 A1    5/2009 Park
2011/0006975 A1    1/2011 Nagashima et al.
2011/0216275 A1*   9/2011 Lee ...................... G02F 1/1335
                                                349/106

FOREIGN PATENT DOCUMENTS

CN    101866084 A    10/2010
CN    101963723 A    1/2011
(Continued)

OTHER PUBLICATIONS

International Search Report & Written Opinion dated Apr. 8, 2016 regarding PCT/CN2015/097024.
(Continued)

*Primary Examiner* — Cuong Q Nguyen
*Assistant Examiner* — Tong-Ho Kim
(74) *Attorney, Agent, or Firm* — Intellectual Valley Law, P.C.

(57) ABSTRACT

The present disclosure provides an array substrate comprising a plurality of data lines and a plurality of groups of gate lines, a display panel comprising the array substrate, a display device comprising the display panel and an electronic device comprising the display device. The plurality of data lines and the plurality of groups of gate lines intersect each other for dividing the array substrate into a plurality of pixel units. Each group of gate lines defines a row of a
(Continued)

plurality of pixel units and comprises a first gate line and a second gate line. Each pixel unit comprises a first pixel electrode and a second pixel electrode, the first pixel electrode corresponds to the second gate line and the second pixel electrode corresponds to the first gate line. Each pixel unit comprises a first repair unit electrically coupled to the first pixel electrode and forming a first repair capacitance with the first gate line, and a second repair unit electrically coupled to the second pixel electrode and forming a second repair capacitance with the second gate line. Each pixel unit further comprises a main compensating unit electrically coupled to the first pixel electrode and forming a compensation capacitance with the second gate line.

20 Claims, 4 Drawing Sheets (51) Int. Cl.
G02F 1/1368 (2006.01)
G02F 1/1343 (2006.01)

(52) U.S. Cl.
CPC .. *G02F 1/134309* (2013.01); *G02F 1/136259* (2013.01); *G02F 1/136286* (2013.01); *G02F 2201/121* (2013.01); *G02F 2201/123* (2013.01)

(58) Field of Classification Search
CPC ............. G02F 1/136286; G02F 1/1368; G02F 2201/121; G02F 2201/123
USPC ............................................ 257/71; 349/106
See application file for complete search history.

(56) References Cited

FOREIGN PATENT DOCUMENTS

| CN | 202307894 U | | 7/2012 |
|----|-------------|---|--------|
| CN | 104570530 A | * | 4/2015 |
| CN | 104570530 A | | 4/2015 |
| CN | 104680998 A | | 6/2015 |
| CN | 104898343 A | | 9/2015 |
| JP | 11352520 A | | 12/1999 |

OTHER PUBLICATIONS

The First Office Action in the Chinese Patent Application No. 201510374462.4, dated Jun. 2, 2017; English translation attached.

* cited by examiner

ARRAY SUBSTRATE, DISPLAY PANEL, DISPLAY DEVICE AND ELECTRONIC DEVICE

CROSS-REFERENCE TO RELATED APPLICATION

This application is a national stage application under 35 U.S.C. §371 of International Application No. PCT/CN2015/097024 filed Dec. 10, 2015, which claims priority to Chinese Patent Application No. 201510374462.4, filed Jun. 30, 2015, the contents of which are incorporated by reference in the entirety.

FIELD

The present invention relates to display technology, specifically, an array substrate, a display panel having the array substrate, and a display device having the display panel.

BACKGROUND

Figure 1:
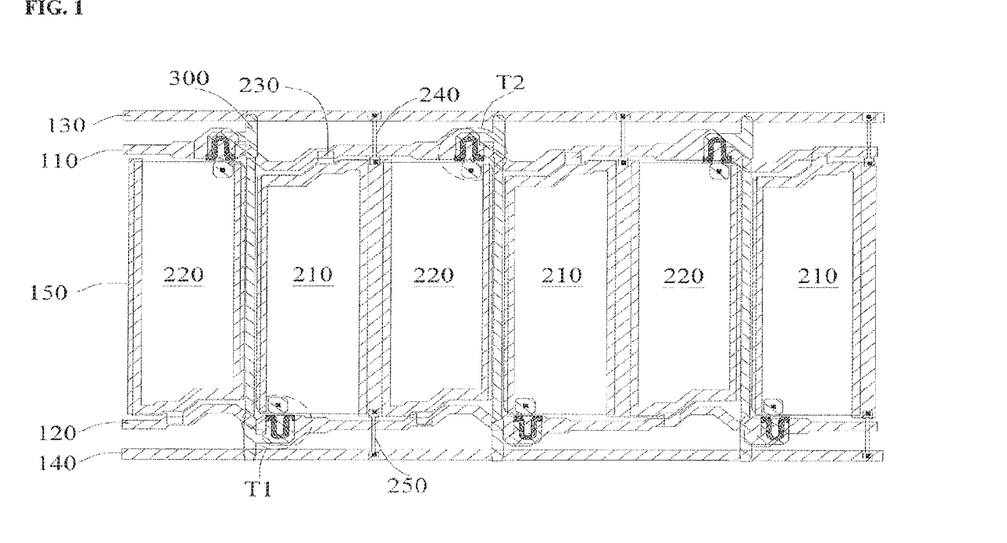
FIG. 1 is a block diagram illustrating a section of a conventional double gate array substrate.

FIG. 1 shows an array substrate having a double gate structure. As shown in FIG. 1, each pixel unit has a first gate line 110 and a second gate line 120. The first gate line 110 and the second gate line 120 intersect with data line 300 thereby defining a pixel unit. Each pixel unit has a first pixel electrode 210 and a second pixel electrode 220. The first pixel electrode 110 and the second gate line 120 correspond to thin film transistor T1, and the second pixel electrode 220 and the first gate line 110 correspond to thin film transistor T2.

An array substrate having a double gate structure has half the numbers of data lines as compared to an array substrate having a single gate structure.

Typically, the pixel unit in an array substrate having a double gate structure includes a first repair unit and a second repair unit, thereby reducing or eliminating the bright line between two adjacent pixel units. In a conventional double-gate array substrate, the feed through voltages of the first and the second pixel electrodes result in color shift and flicker, which in turn affect the display quality.

Accordingly, there is a need for reducing or eliminating color shift and flicker in display panels.

SUMMARY

In one aspect, the present invention provides an array substrate, a display panel having the array substrate and a display device having the display panel. A display panel having the array substrate according to the present disclosure has reduced or eliminated color shift and flicker when a display is produced.

In one aspect, the present invention provides an array substrate comprising a plurality of data lines and a plurality of groups of gate lines, wherein the plurality of data lines and the plurality of groups of gate lines intersecting each other for dividing the array substrate into a plurality of pixel units, each group of gate lines defines a row of a plurality of pixel units and comprises a first gate line and a second gate line. Each pixel unit comprises a first pixel electrode and a second pixel electrode; the first pixel electrode corresponds to the second gate line and the second pixel electrode corresponds to the first gate line. Each pixel unit comprises a first repair unit electrically coupled to the first pixel electrode and forming a first repair capacitance with the first gate line; a second repair unit electrically coupled to the second pixel electrode and forming a second repair capacitance with the second gate line; and a main compensating unit electrically coupled to the first pixel electrode and forming a compensation capacitance with the second gate line. In some embodiments, the main compensating unit protrudes from the first pixel electrode towards the second gate line, and overlaps with a portion of the second gate line. In some embodiments, the first repair unit protrudes from the first pixel electrode towards the first gate line, and overlaps with a portion of the first gate line. In some embodiments, the second repair unit protrudes from the second pixel electrode towards the second gate line, and overlaps with a portion of the second gate line. In some embodiments, the plurality of pixel electrodes are disposed side-by-side within each of the pixel unit. In some embodiments, the compensation capacitance is substantially the same as the first repair capacitance. In some embodiments, the overlapping area between the main compensation unit and the second gate line is substantially the same as the overlapping area between the first repair unit and the first gate line. In some embodiments, the feed through voltages of the first electrode and the second electrode are substantially the same due to the main compensation unit. In some embodiments, the first repair capacitance is substantially the same as the second repair capacitance. In some embodiments, the main compensating unit is integrally formed with the first pixel electrode as a single body. In some embodiments, the pixel unit further comprises an ancillary compensation unit, the ancillary compensation unit forms an ancillary capacitance with the first gate line. In some embodiments, the ancillary compensation unit overlaps with a portion of the first gate line. In some embodiments, the resistance-capacitive loading (RC loading) of the first gate line is substantially the same as the RC loading of the second gate line due to the ancillary compensation unit. In some embodiments, within the same row of a plurality of pixel units, the sum of the RC loading of the first gate lines is substantially the same as the sum of the RC loading of the second gate lines. In some embodiments, the array substrate comprises a common electrode and a group of common electrode lines, disposed at the same layer with the gate line. In some embodiments, each of the pixel unit comprises a row of the common electrodes. In some embodiments, the group of common electrode lines comprises a first common electrode line and a second common electrode line, the first common electrode line is adjacent to the first gate line, the second common electrode line is adjacent to the second gate line. In some embodiments, the array substrate further comprises a first connection unit coupling the first common electrode line to the common electrode, In some embodiments, the array substrate further comprises a second connection unit coupling the second common electrode line to the common electrode. In some embodiments, the common electrode is a strip electrode surrounding edges of the pixel electrode. In some embodiments, the first connection unit and the second connection unit are both disposed at the same layer with the first pixel electrode and the second pixel electrode. In some embodiments, one end of the first connection unit is connected to the common electrode through a via. In some embodiments, the other end of the first connection unit is connected to the first common electrode line through a via. In some embodiments, one end of the second connection unit is connected to the common electrode through a via. In some embodiments, the other end of the second connection unit is connected to the second common electrode line through a via. In some embodiments, each of the pixel unit comprises the first connection unit. In some embodiments, the ancillary compensation unit is integrally formed with the first connection unit as a single body. In some embodiments, the length direction of the ancillary compensation unit intersects with the length direction of the first connection unit. In some embodiments, within the same row of a plurality of pixel units, the sum of the overlapping areas between the main compensation units and the second gate lines are substantially the same as the sum of the overlapping areas between the ancillary compensation units and the first gate lines. In some embodiments, within the same row of a plurality of pixel units, only the pixel units in the odd columns or only the pixel units in the even columns comprise the ancillary compensation units. In some embodiments, the ancillary compensation units have substantially the same dimensional shape, and the main compensation units have substantially the same dimensional shape. In some embodiments, each individual overlapping area between the ancillary compensation unit and the first gate line is twice that of each individual overlapping area between the main compensation unit and the second gate line.

In another aspect, it provides an array substrate. The array substrate comprises a plurality of data lines and a plurality of groups of gate lines, wherein the plurality of data lines and the plurality of groups of gate lines intersect each other thereby dividing the array substrate into a plurality of pixel units. Each group of gate lines comprises a first gate line and a second gate line. Each group of gate lines defines a row of a plurality of pixel units. A plurality of pixel electrodes are disposed side-by-side within each of the pixel unit. The plurality of pixel electrodes comprises a first pixel electrode and a second pixel electrode. The first pixel electrode corresponds to the second gate line and the second pixel electrode corresponds to the first gate line. The pixel unit further comprises a first repair unit and a second repair unit. The first repair unit is electrically coupled to the first pixel electrode, protrudes from the first pixel electrode towards the first gate line, and overlaps with a portion of the first gate line. The second repair unit is electrically coupled to the second pixel electrode, protrudes from the second pixel electrode towards the second gate line, and overlaps with a portion of the second gate line. The pixel unit further comprises a main compensating unit electrically coupled to the first pixel electrode. The main compensating unit protrudes from the first pixel electrode towards the second gate line, and overlaps with a portion of the second gate line, thereby forming a compensation capacitance.

Optionally, the compensation capacitance equals to the capacitance formed between the first repair unit and the first gate line.

Optionally, the main compensation unit is integrally formed with the first pixel electrode as a single body, and the overlapping area between the main compensation unit and the second gate line is substantially the same as the overlapping area between the first repair unit and the first gate line.

Optionally, the pixel unit further comprises an ancillary compensation unit, the ancillary compensation unit overlaps with a portion of the first gate line, thereby forming capacitance with the first gate line.

Optionally, the array substrate comprises a common electrode and a group of common electrode lines, disposed at the same layer with the gate line. Each of the pixel unit comprises a row of the common electrodes. The group of common electrode lines comprises a first common electrode line and a second common electrode line, the first common electrode line is adjacent to the first gate line, the second common electrode line is adjacent to the second gate line. The array substrate further comprises a first common electrode connection unit coupling the first common electrode line to the common electrode, and a second common electrode connection unit coupling the second common electrode line to the common electrode. The common electrode is a strip electrode surrounding edges of the pixel electrode.

Optionally, the first common electrode connection unit and the second common electrode connection unit are both disposed at the same layer with the first pixel electrode and the second pixel electrode. One end of the first common electrode connection unit is connected to the common electrode through a via, the other end of the first common electrode connection unit is connected to the first common electrode line through a via. One end of the second common electrode connection unit is connected to the common electrode through a via, and the other end of the second common electrode connection unit is connected to the second common electrode line through a via.

Optionally, each of the pixel unit comprises the first common electrode connection unit. The ancillary compensation unit is integrally formed with the first common electrode connection unit as a single body. The length direction of the ancillary compensation unit intersects with the length direction of the first connection unit.

Optionally, within the same row of a plurality of pixel units, the sum of the overlapping areas between the main compensation units and the second gate lines are substantially the same as the sum of the overlapping areas between the ancillary compensation units and the first gate lines.

Optionally, within the same row of a plurality of pixel units, only the pixel units in the odd columns or only the pixel units in the even columns comprise the ancillary compensation units. All ancillary compensation units have substantially the same dimensional shape, and all main compensation units have substantially the same dimensional shape. Each individual overlapping area between the ancillary compensation unit and the first gate line is 1.5 times of each individual overlapping area between the main compensation unit and the second gate line.

In another aspect, it provides a display panel comprising an array substrate of the present embodiments.

In another aspect, it provides a display device comprising a display panel of the present embodiments.

In another aspect, it provides an electronic device comprising a display device of the present embodiments and an adaptor driving the display device.

In comparison to the existing technology, due to the compensation capacitance formed by the main compensation unit, the feed through voltages of the first pixel electrode and the second pixel electrode become closer, thereby reducing or even eliminating flicker and color shift during polarity inversion in a display panel having the array substrate of the present embodiments.

BRIEF DESCRIPTION OF THE FIGURES

The following drawings are merely examples for illustrative purposes according to various disclosed embodiments and are not intended to limit the scope of the present disclosure.

DETAILED DESCRIPTION OF THE EMBODIMENTS

Illustrative embodiments of the present invention will now be described in detail with reference to the accompanying drawings. It is to be understood that these illustrative embodiments do not limit the scope of the invention, but merely serve to clarify the invention.

It was discovered that the differences between the feed through voltage ($\Delta Vp$) of the first and the second pixel electrodes within the same pixel unit result in flicker and color shift observed in a double gate array substrate as shown in FIG. 1.

Figure 2:
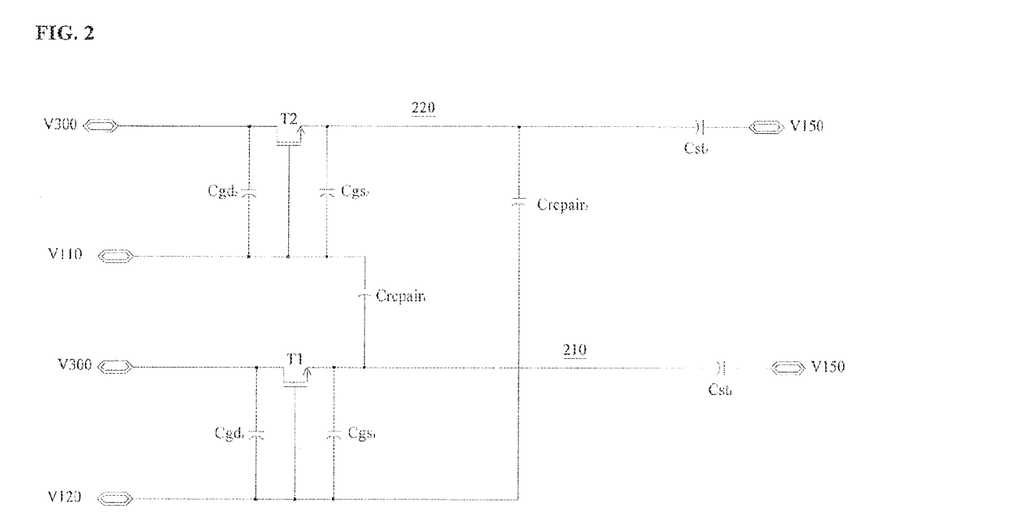
FIG. 2 shows an equivalent circuit diagram of a pixel unit of the array substrate in FIG. 1.

Specifically, FIG. 2 shows an equivalent circuit diagram of a pixel unit within the array substrate of FIG. 1.

In FIG. 2, V300 represents the data voltage on data line 300. V110 represents the scan voltage on the first gate line 110. V120 represents the scan voltage on the second gate line 120. V150 represents the voltage on the common electrode 150. $C_{gd1}$ represents the capacitance between gate and drain of the first thin film transistor T1. $C_{gs1}$ represents the capacitance between gate and source of the first thin film transistor T1. $C_{st1}$ represents the storage capacitance formed between the first pixel electrode and the common electrode. $C_{gd2}$ represents the capacitance between gate and drain of the first thin film transistor T2. $C_{gs2}$ represents the capacitance between gate and source of the first thin film transistor T2. $C_{st2}$ represents the storage capacitance formed between the second pixel electrode and the common electrode.

Polarity inversion is typically required when a display is produced in a liquid crystal display panel. During polarity inversion, the voltages on the first pixel electrode and the second pixel electrode switch from high level voltage to low level voltage, or from low level voltage to high level voltage.

Feed through voltage on the first pixel electrode can be calculated according to the following formula:

$$\Delta Vp = (Vgh - Vgl) \cdot \frac{Cgs_1}{Cgs_1 + Cst_1 + Clc_1 + Crepair_1}$$

wherein, $\Delta Vp$ is the feed through voltage of the first pixel electrode;

Vgh is the high level voltage coupled to the first pixel electrode;

Vgl is the low level voltage coupled to the first pixel electrode;

$Cgs_1$ is the capacitance between gate and source of the first thin film transistor T1;

$Cst_1$ is the storage capacitance formed between the first pixel electrode and the common electrode;

$Crepair_1$ is the capacitance formed between the first repair unit and the first gate line;

$Clc_1$ is the liquid crystal capacitance of the first pixel electrode.

Feed through voltage on the second pixel electrode can be calculated according to the following formula:

$$\Delta Vp' = (Vgh - Vgl) \cdot \frac{Cgs_2}{Cgs_2 + Cst_2 + Clc_2 + Crepair_2} + (Vgh - Vgl) \cdot \frac{Crepair_2}{Cgs_2 + Cst_2 + Clc_2 + Crepair_2}$$

wherein, $\Delta Vp'$ is the feed through voltage of the second pixel electrode;

Vgh is the high level voltage coupled to the second pixel electrode;

Vgl is the low level voltage coupled to the second pixel electrode;

$Cgs_2$ is the capacitance between gate and source of the second thin film transistor T2;

$Cst_2$ is the storage capacitance formed between the second pixel electrode and the common electrode;

$Crepair_2$ is the capacitance formed between the second repair unit and the second gate line;

$Clc_2$ is the liquid crystal capacitance of the second pixel electrode.

In a typical double gate array substrate, the first pixel electrode and the second pixel electrode have substantially the same dimensional shapes. Also, the first thin film transistor T1 and the second thin film transistor T2 have substantially the same structures. Thus, $Cgs_1 = Cgs_2$. $Cst_1 = Cst_2$. $Crepair_1 = Crepair_2$, $Clc_1 = Clc_2$. Accordingly, $\Delta Vp \neq \Delta Vp'$, i.e., during polarity inversion, the feed through voltage of the first pixel electrode is different from the feed through voltage of the second pixel electrode. This difference in feed through voltage results in color shift and flicker when a display is produced in a display device having the array substrate as shown in FIG. 1.

Figure 3:
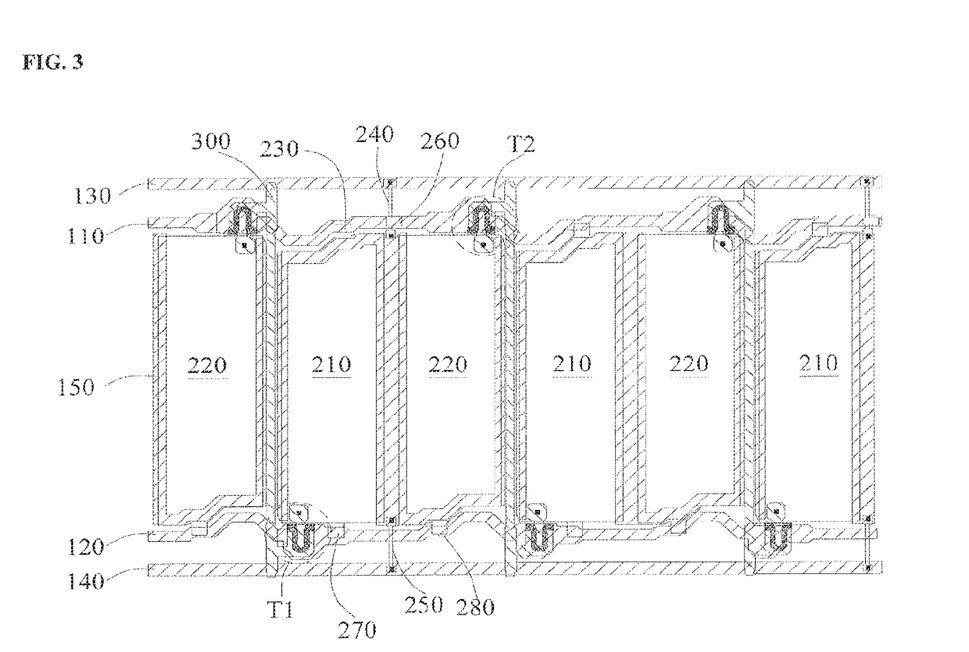
FIG. 3 is a block diagram illustrating a section of an exemplary double gate array substrate of the present embodiments.

In one illustrative embodiment as shown in FIG. 3, the present embodiment provides an array substrate comprising a plurality of data lines 300 and a plurality of groups of gate lines.

The plurality of data lines 300 and the plurality of groups of gate lines intersect each other thereby dividing the array substrate into a plurality of pixel units. Each group of gate lines comprises a first gate line 110 and a second gate line 120, each group of gate lines defines a row of a plurality of pixel units. A plurality of pixel electrodes are disposed side-by-side within each of the pixel unit. The plurality of pixel electrodes comprises a first pixel electrode 210 and a second pixel electrode 220. The first pixel electrode 210 corresponds to the second gate line 120. The second pixel electrode 220 corresponds to the first gate line 110. The pixel unit further comprises a first repair unit 230 and a second repair unit 280. The first repair unit 230 is electrically coupled to the first pixel electrode 210, protrudes from the first pixel electrode 210 towards the first gate line 110, and overlaps with a portion of the first gate line 110. The second repair unit 280 is electrically coupled to the second pixel electrode 220, protrudes from the second pixel electrode 220 towards the second gate line 120, and overlaps with a portion of the second gate line 120. The pixel unit further comprises a main compensating unit 270 electrically coupled to the first pixel electrode 210. The main compensating unit 270 protrudes from the first pixel electrode towards the second gate line 120, and overlaps with a portion of the second gate line 120, thereby forming a compensation capacitance Cito.

Figure 4:
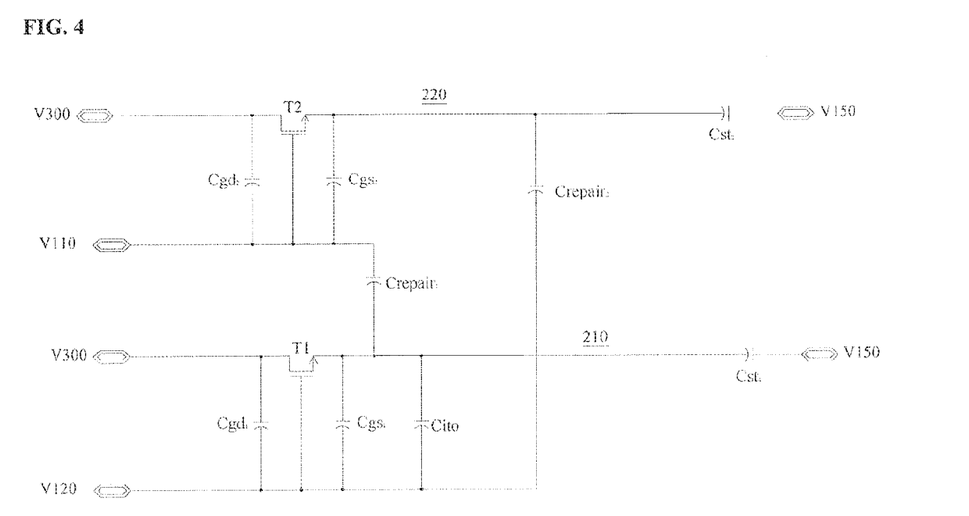
FIG. 4 shows an equivalent circuit diagram of a pixel unit of an exemplary array substrate of the present embodiments.

FIG. 4 shows an equivalent circuit diagram of a pixel unit of the exemplary array substrate of FIG. 3. As shown in the figure, the compensation capacitance is electrically connected in series with the capacitance formed between the first repair unit and the first gate line.

With the inclusion of a main compensation unit, the feed through voltage of the second pixel electrode 220 remains substantially the same during polarity inversion, whereas the feed through voltage of the first pixel electrode 210 changes. The term "substantially the same" does not always means "perfectly the same" and it means "the same" to such an extent that the advantages of the embodiments are exhibited. In some embodiments, the term "substantially the same" means that two values are at least 80%, at least 85%, at least 90%, at least 95%, at least 96%, at least 97%, at least 98%, at least 99%, at least 99.5%, or at least 99.9% identical. The feed through voltage of the first pixel electrode 210 with the inclusion of the main compensation unit can be calculated using the following formula:

$$\Delta Vp'' = (Vgh - Vgl) \cdot \frac{Cgs_1}{Cgs_1 + Cst_1 + Clc_1 + Crepair_1 + Cito} + (Vgh - Vgl) \cdot \frac{Cito}{Cgs_1 + Cst_1 + Clc_1 + Crepair_2 + Cito}$$

wherein, $\Delta Vp''$ is the feed through voltage of the first pixel electrode with the inclusion of the main compensation unit;

Vgh is the high level voltage coupled to the first pixel electrode;

Vgl is the low level voltage coupled to the first pixel electrode;

$Cgs_1$ is the capacitance between gate and source of the first thin film transistor T1;

$Cst_1$ is the storage capacitance formed between the first pixel electrode and the common electrode;

$Crepair_1$ is the capacitance formed between the first repair unit and the first gate line;

Cito is the compensation capacitance Cito of the main compensation unit;

$Clc_1$ is the liquid crystal capacitance of the first pixel electrode.

$Crepair_1$ formed by the first repair unit and Cito formed by the main compensation unit are relatively small as compared to the liquid crystal capacitance $Clc_1$ and the storage capacitance $Cst_1$. Thus, $Crepair_1$ and Cito in the above formula are so minimal that they are negligible. Accordingly, the feed through voltage of the first pixel electrode 210 with the inclusion of the main compensation unit 270 can be calculated using the following formula:

$$\Delta Vp'' = (Vgh - Vgl) \cdot \frac{Cgs_1}{Cgs_1 + Cst_1 + Clc_1} + (Vgh - Vgl) \cdot \frac{Cito}{Cgs_1 + Cst_1 + Clc_1}$$

In comparison to the existing technology, due to the compensation capacitance formed by the main compensation unit, the feed through voltages of the first pixel electrode and the second pixel electrode become closer, thereby reducing or even eliminating flicker and color shift during polarity inversion in a display panel having the array substrate of the embodiments.

As shown in FIG. 3, each pixel unit comprises two thin film transistors, i.e., the first thin film transistor T1 and the second thin film transistor T2. As shown in the figure, the drain of the first thin film transistor T1 is connected to the first pixel electrode 210, and the drain of the second thin film transistor T2 is connected to the second pixel electrode 220. As used herein the term "the first pixel electrode 210 corresponds to the second gate line 120 and the second pixel electrode 220 corresponds to the first gate line 110" means that "the second gate line 120 is connected to the gate of the first thin film transistor T1, and the first gate line 110 is connected to the gate of the second thin film transistor T2."

To ensure that the feed through voltages of the first and the second pixel electrodes are substantially the same, in an embodiment, $Crepair_1$ formed by the first repair unit and Cito formed by the main compensation unit can be designed to be substantially the same.

Accordingly, the formula for calculating the feed through voltage of the first pixel electrode 210 with the inclusion of a main compensation unit 270 is transformed as follow:

$$\Delta Vp'' = (Vgh - Vgl) \cdot \frac{Cgs_1}{Cgs_1 + Cst_1 + Clc_1} + (Vgh - Vgl) \cdot \frac{Crepair_1}{Cgs_1 + Cst_1 + Clc_1}$$

Thus, $\Delta Vp = \Delta Vp''$, i.e., the feed through voltages of the first and the second pixel electrodes are substantially the same, thereby eliminating color shift and flicker resulting from different feed through voltages.

Optionally, the main compensation unit is integrally formed with the first pixel electrode as a single body for manufacture convenience and to ensure that Cito formed by the main compensation unit and $Crepair_1$ formed by the first repair unit are substantially the same.

Figure 5:
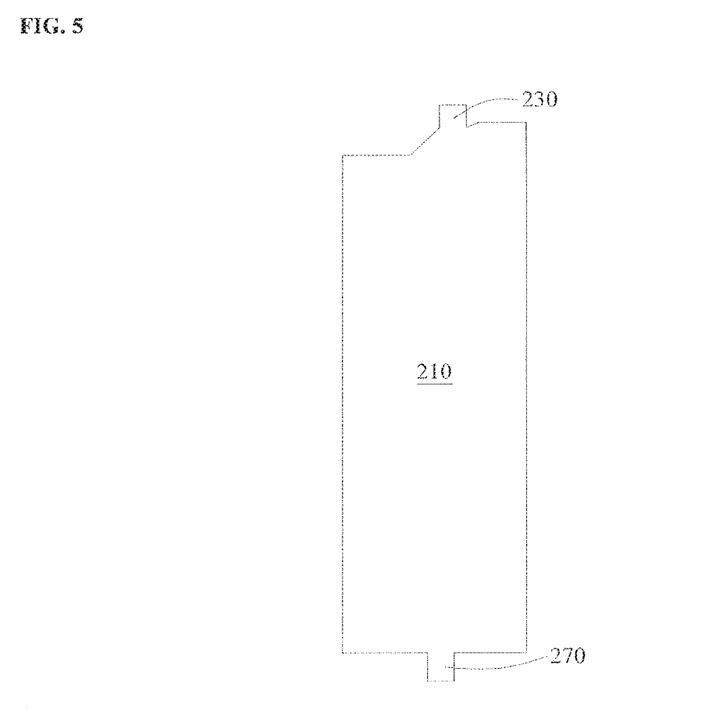
FIG. 5 is a diagram illustrating a first pixel electrode within a pixel unit of an exemplary array substrate of the present embodiments.

FIG. 5 shows a diagram illustrating a first pixel electrode 210 having a main compensation unit 270 and a first repair unit 230. As shown in the figure, the main compensation unit 270 and the first repair unit 230 are both integrally formed with the first pixel electrode as a single body, and located at two distal terminals of the first pixel electrode 210.

The inclusion of a main compensation unit 270 increases the resistive-capacitive loading (RC loading) of the second gate line 120. Optionally, the pixel unit comprises an ancillary compensation unit 260. The ancillary compensation unit overlaps with a portion of the first gate line, thereby forming capacitance with the first gate line. The inclusion of the ancillary compensation unit 260 increases the RC loading of the first gate line 110 to a value that is closer to, or substantially the same as, that of the second gate line 120.

Typically the array substrate further comprises a common electrode, thereby forming storage capacitance and liquid crystal capacitance with the first and the second pixel electrodes. Any common electrode with a suitable structure can be used in the present disclosure for forming storage capacitance and liquid crystal capacitance with the first and the second pixel electrodes. For example, a transparent electrode material can be used for making a common electrode on the front surface.

Figure 7:
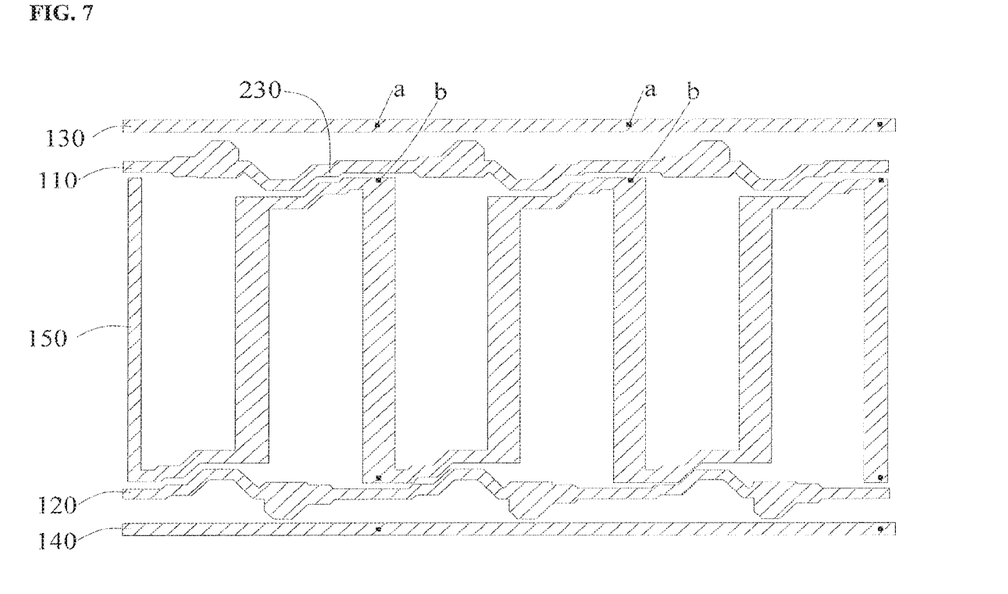
FIG. 7 is a block diagram illustrating the metal graphic of a gate line layer.

Optionally the array substrate can comprise a common electrode 150 and a group of common electrode lines disposed at the same layer with the gate line, as exemplified in FIG. 3 and FIG. 7. In other words, the array substrate may have a layer having a common electrode 150, a group of common electrode lines and the gate line. This simplifies manufacturing processes and reduces manufacturing costs. Each of the pixel units comprises a row of the common electrodes 150. A group of common electrode lines comprises a first common electrode line 130 and a second common electrode line 140. The first common electrode line 130 is adjacent to the first gate line 110. The second common electrode line 140 is adjacent to the second gate line 120. Optionally, the array substrate further comprises a first common electrode connection unit 240 coupling the first common electrode line 130 to the common electrode 150, and a second common electrode connection unit 250 coupling the second common electrode line 140 to the common electrode 150. Because the common electrodes are disposed at the same layer with the gate line, they are made of the same material, e.g., a metal material having low resistance. Accordingly, the common electrodes of the embodiments can have relatively small resistance. The first common electrode connection unit 240 and the second common electrode connection unit 250 are used to maintain the uniformity of the common voltage in the panel and to reduce the resistance of the common electrodes.

The first common electrode line 130 and the second common electrode line 140 can be connected to a common signal voltage source, thereby conducting voltage to the common electrodes. Disposing common electrodes and gate lines at the same layer can simplify manufacturing process. In order to improve the aperture ratio of the array substrate, the common electrode 150 can be optionally a strip electrode located at the edge of the pixel electrode (e.g., surrounding the edge of the first pixel electrode 210 and/or the second pixel electrode 220). Optionally, the areas surrounded by the first and the second common electrodes correspond to the first pixel electrode 210 and the second pixel electrode 220, respectively.

The first common electrode connection unit 240 and the second common electrode connection unit 250 can be disposed at any suitable layer in the array substrate. For example, the first common electrode connection unit 240 and the second common electrode connection unit 250 can be disposed at the same layer with the first pixel electrode 210 and the second pixel electrode 220. One end of the first connection unit 240 can be connected to the common electrode 150 through a via. The other end of the first connection unit 240 can be connected to the first common electrode line 130 through a via. Similarly, one end of the second connection unit 250 can be connected to the common electrode 150 through a via, and the other end of the second connection unit 250 can be connected to the second common electrode line through a via.

Figure 6:
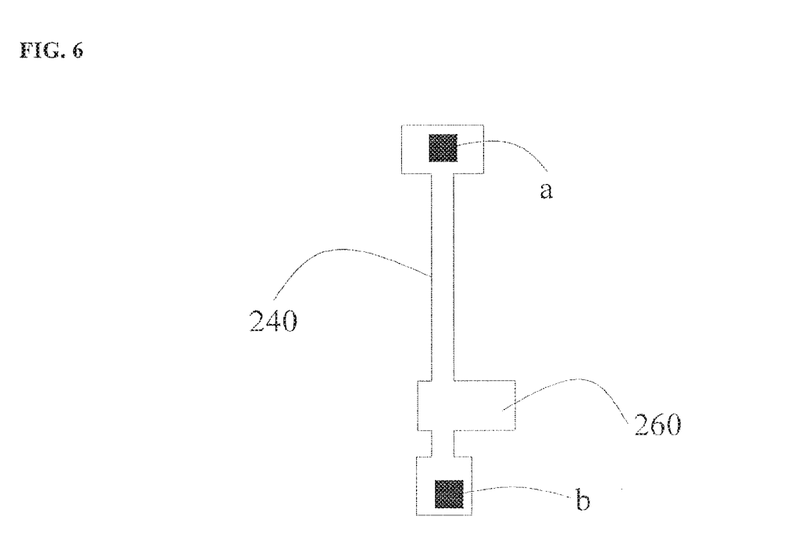
FIG. 6 is a diagram illustrating a common electrode connection unit of an exemplary array substrate of the present embodiments.

The ancillary compensation unit 260 forms capacitance with the first gate line 110. Optionally, each pixel unit comprises a first common electrode connection unit 240 in order to provide electrical signal to the ancillary compensation unit 260. The ancillary compensation unit 260 can be integrally formed with the first connection unit 240 as a single body. Optionally, the length direction of the ancillary compensation unit 260 intersects with the length direction of the first connection unit 240 (FIG. 6). As shown in FIG. 6, one end of the first common electrode connection unit 240 comprises a via a, and the other end of the first common electrode connection unit 240 comprises a via b. The first connection unit 240 is connected to the common electrode line 130 through the via a, and connected to the common electrode 150 through the via b.

Optionally, RC loadings of the first gate line 110 and the second gate line 120 are substantially the same. Optionally, within the same row of a plurality of pixel units, the sum of the overlapping areas between the main compensation units 270 and the second gate lines 120 are substantially the same as the sum of the overlapping areas between the ancillary compensation units 260 and the first gate lines 110.

The numbers of the main compensation units 270 and the numbers of the ancillary compensation units 260 can be the same or different, so long as, within the same row of a plurality of pixel units, the sum of the overlapping areas between the main compensation units 270 and the second gate lines 120 are substantially the same as the sum of the overlapping areas between the ancillary compensation units 260 and the first gate lines 110.

In a non-limiting, exemplary embodiment, each pixel electrode 210 comprises a main compensation unit 270. However, within the same row of a plurality of pixel units, only the pixel units in the odd columns or only the pixel units in the even columns comprise the ancillary compensation units 260. In order to make sure the sum of the overlapping areas between the main compensation units 270 and the second gate lines 120 are substantially the same as the sum of the overlapping areas between the ancillary compensation units 260 and the first gate lines 110, each individual overlapping area between the ancillary compensation unit and the first gate line is 1.5 times of each individual overlapping area between the main compensation unit and the second gate line.

As shown in FIG. 3, within the same row of a plurality of pixel units, if the pixel units are even, the numbers of the main compensation units 270 are 2 times of the numbers of the ancillary compensation units 260; if the pixel units are odd, the numbers of the main compensation units 270 are 1.5 times of the numbers of the ancillary compensation units 260. In another embodiment, within the same row of a plurality of pixel units, each pixel unit includes a main compensation unit 270 disposed, e.g., in the pixel electrode 210. However, the ancillary compensation units 260 are disposed only in one out of two pixel units within the same row of the plurality of pixel units. Thus, in two pixel units, there are two main compensation units 270 and one ancillary compensation units 260, i.e., the numbers of the main compensation units 270 are 2 times of the numbers of the ancillary compensation units 260. In another embodiment, within the same row of a plurality of pixel units, each pixel unit includes a main compensation unit 270 disposed, e.g., in the pixel electrode 210. However, the ancillary compensation units 260 are disposed only in two out of three pixel units within the same row of the plurality of pixel units. Thus, in three pixel units, there are three main compensation units 270 and two ancillary compensation units 260, i.e., the numbers of the main compensation units 270 are 1.5 times of the numbers of the ancillary compensation units 260. For manufacture convenience, all ancillary compensation units can have substantially the same dimensional shape, and all main compensation units can have substantially the same dimensional shape. In some embodiments, each individual overlapping area between the ancillary compensation unit and the first gate line is 1.5 times or 2 times of each individual overlapping area between the main compensation unit and the second gate line, depending on the area ratio between the main compensation units 270 and the ancillary compensation units 260. This ensures that, within the same row of a plurality of pixel units, the sum of the overlapping areas between the main compensation units 270 and the second gate lines 120 are substantially the same as the sum of the overlapping areas between the ancillary compensation units 260 and the first gate lines 110.

The array substrate can be an array substrate comprising any type of thin film transistor. For example, the thin film transistor can be a thin film field effect transistor, an amorphous silicon thin film transistor, or a low temperature polysilicon thin film transistor.

In another aspect, it provides a display panel comprising the array substrate of the above embodiments.

Flicker or color shift is reduced or eliminated when a display is produced in the display panel of the embodiments.

The display panel can be a liquid crystal display panel. Accordingly, the liquid crystal display panel can further comprise an assembling substrate assembled together with an array substrate to form a cell. Liquid crystal material is then filled between the assembling substrate and the array substrate.

In another aspect, it provides a display device comprising the display panel of the embodiments.

The display device can be a television, a mobile phone, a computer or many other electronic devices.

It will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. An array substrate, comprising:
a plurality of data lines and a plurality of groups of gate lines, wherein the plurality of data lines and the plurality of groups of gate lines intersecting each other for dividing the array substrate into a plurality of pixel units, each group of gate lines defines a row of a plurality of pixel units and comprises a first gate line and a second gate line;
wherein each pixel unit comprises a first pixel electrode and a second pixel electrode, the first pixel electrode corresponds to the second gate line and the second pixel electrode corresponds to the first gate line; a first repair unit electrically coupled to the first pixel electrode and forming a first repair capacitance with the first gate line; a second repair unit electrically coupled to the second pixel electrode and forming a second repair capacitance with the second gate line; and a main compensating unit electrically coupled to the first pixel electrode and forming a compensation capacitance with the second gate line;
feed through voltages of the first pixel electrode and the second pixel electrode are substantially the same due to the main compensation unit;
the pixel unit further comprises an ancillary compensation unit, the ancillary compensation unit forming an ancillary capacitance with the first gate line; and
resistance-capacitive loading (RC loading) of the first gate line is substantially the same as RC loading of the second gate line due to the ancillary compensation unit.

2. The array substrate according to claim 1, wherein, within the same row of a plurality of pixel units, the sum of RC loading of the first gate lines is substantially the same as the sum of the RC loading of the second gate lines.

3. An array substrate comprising:
a plurality of data lines and a plurality of groups of gate lines, wherein the plurality of data lines and the plurality of groups of gate lines intersecting each other for dividing the array substrate into a plurality of pixel units, each group of gate lines defines a row of a plurality of pixel units and comprises a first gate line and a second gate line;
wherein each pixel unit comprises a first pixel electrode and a second pixel electrode, the first pixel electrode corresponds to the second gate line and the second pixel electrode corresponds to the first gate line; a first repair unit electrically coupled to the first pixel electrode and forming a first repair capacitance with the first gate line; a second repair unit electrically coupled to the second pixel electrode and forming a second repair capacitance with the second gate line; and a main compensating unit electrically coupled to the first pixel electrode and forming a compensation capacitance with the second gate line; and
the compensation capacitance is substantially the same as the first repair capacitance.

4. The array substrate according to claim 3, wherein the main compensating unit protruding from the first pixel electrode towards the second gate line, and overlapping with a portion of the second gate line; the first repair unit protruding from the first pixel electrode towards the first gate line, and overlapping with a portion of the first gate line, and the second repair unit protruding from the second pixel electrode towards the second gate line, and overlapping with a portion of the second gate line; wherein the plurality of pixel electrodes are disposed side-by-side within each of the pixel unit.

5. The array substrate according to claim 3, wherein a value of the compensation capacitance and a value of the first repair capacitance are at least 95% identical.

6. The array substrate according to claim 3, wherein values of the feed through voltages of the first pixel electrode and the second pixel electrode are at least 95% identical.

7. The array substrate according to claim 3, wherein the first repair capacitance is substantially the same as the second repair capacitance.

8. The array substrate according to claim 3, wherein the main compensating unit is integrally formed with the first pixel electrode as a single body.

9. The array substrate according to claim 3, wherein the pixel unit further comprises an ancillary compensation unit, the ancillary compensation unit forming an ancillary capacitance with the first gate line.

10. The array substrate according to claim 9, wherein the ancillary compensation unit overlapping with a portion of the first gate line.

11. The array substrate according to claim 9, wherein, within the same row of a plurality of pixel units, the sum of RC loading of the first gate lines is substantially the same as the sum of the RC loading of the second gate lines.

12. The array substrate according to claim 9, wherein, within the same row of a plurality of pixel units, the sum of the overlapping areas between the main compensation units and the second gate lines are substantially the same as the sum of the overlapping areas between the ancillary compensation units and the first gate lines.

13. The array substrate according to claim 12, wherein, within the same row of a plurality of pixel units, only the pixel units in odd columns or only the pixel units in even columns comprise the ancillary compensation units, the ancillary compensation units have substantially the same dimensional shape, and the main compensation units have substantially the same dimensional shape, each individual overlapping area between the ancillary compensation unit and the first gate line is 1.5 times of each individual overlapping area between the main compensation unit and the second gate line.

14. The array substrate according to claim 3, wherein the array substrate comprises a common electrode and a group of common electrode lines, disposed at the same layer with the gate line; each of the pixel unit comprises a row of the common electrodes, the group of common electrode lines comprises a first common electrode line and a second common electrode line, the first common electrode line is adjacent to the first gate line, the second common electrode line is adjacent to the second gate line, wherein the array substrate further comprises a first connection unit coupling the first common electrode line to the common electrode, and a second connection unit coupling the second common electrode line to the common electrode.

15. The array substrate according to claim 14, wherein a compensation unit coupled to the second pixel electrode and forming a compensation capacitance with the first gate line is absent in the array substrate.

16. The array substrate according to claim 14, wherein the first connection unit and the second connection unit are both disposed at the same layer with the first pixel electrode and the second pixel electrode, one end of the first connection unit is connected to the common electrode through a via, the other end of the first connection unit is connected to the first common electrode line through a via, one end of the second connection unit is connected to the common electrode through a via, and the other end of the second connection unit is connected to the second common electrode line through a via.

17. The array substrate according to claim 14, wherein the pixel unit further comprises an ancillary compensation unit, the ancillary compensation unit forming an ancillary capacitance with the first gate line;

each of the pixel unit comprises the first connection unit, the ancillary compensation unit is integrally formed with the first connection unit as a single body, and the length direction of the ancillary compensation unit intersects with the length direction of the first connection unit.

18. A display apparatus, comprising the array substrate according to claim 3.

19. An array substrate comprising:

a plurality of data lines and a plurality of groups of gate lines, wherein the plurality of data lines and the plurality of groups of gate lines intersecting each other for dividing the array substrate into a plurality of pixel units, each group of gate lines defines a row of a plurality of pixel units and comprises a first gate line and a second gate line;

wherein each pixel unit comprises a first pixel electrode and a second pixel electrode, the first pixel electrode corresponds to the second gate line and the second pixel electrode corresponds to the first gate line; a first repair unit electrically coupled to the first pixel electrode and forming a first repair capacitance with the first gate line; a second repair unit electrically coupled to the second pixel electrode and forming a second repair capacitance with the second gate line; and a main compensating unit electrically coupled to the first pixel electrode and forming a compensation capacitance with the second gate line; and the overlapping area between the main compensation unit and the second gate line is substantially the same as the overlapping area between the first repair unit and the first gate line.

20. The array substrate according to claim 19, wherein a value of the overlapping area between the main compensation unit and the second gate line and a value of the overlapping area between the first repair unit and the first gate line are at least 95% identical.

* * * * *